Aug. 2, 1949.        E. J. DUNHAM                2,477,789
                    INDUSTRIAL TRUCK
Filed Oct. 25, 1945                     14 Sheets-Sheet 1
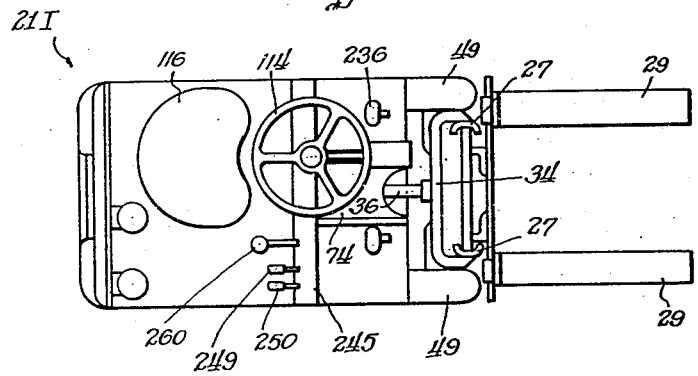
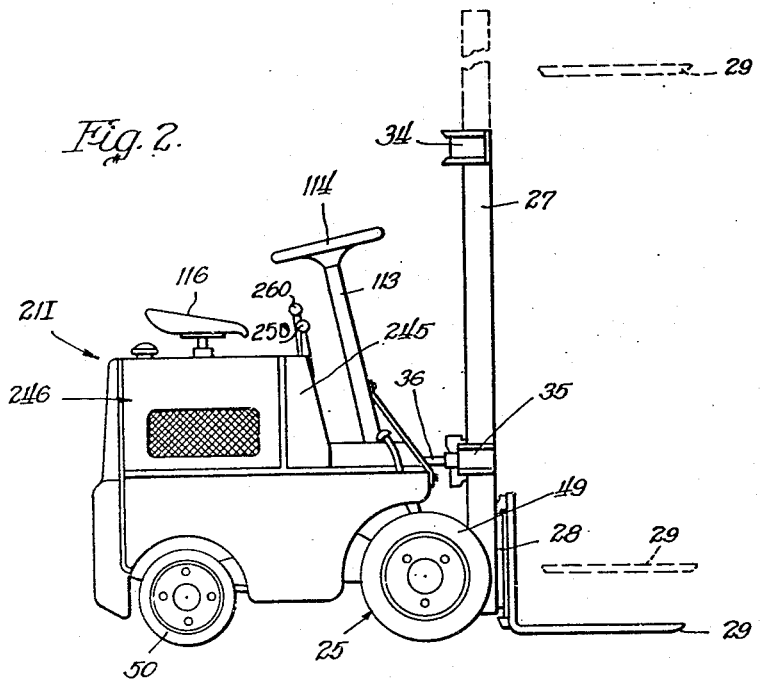
Inventor:
Elmer J. Dunham.

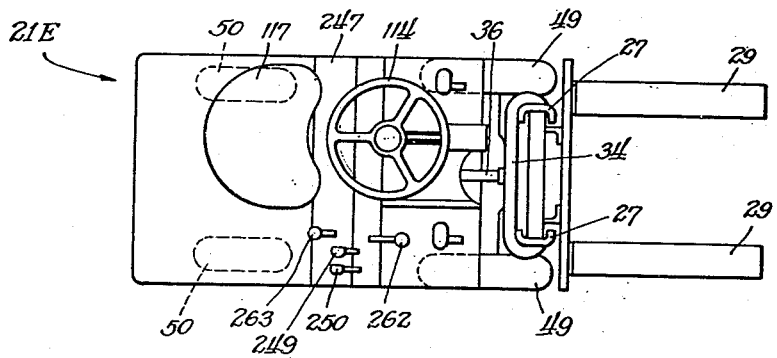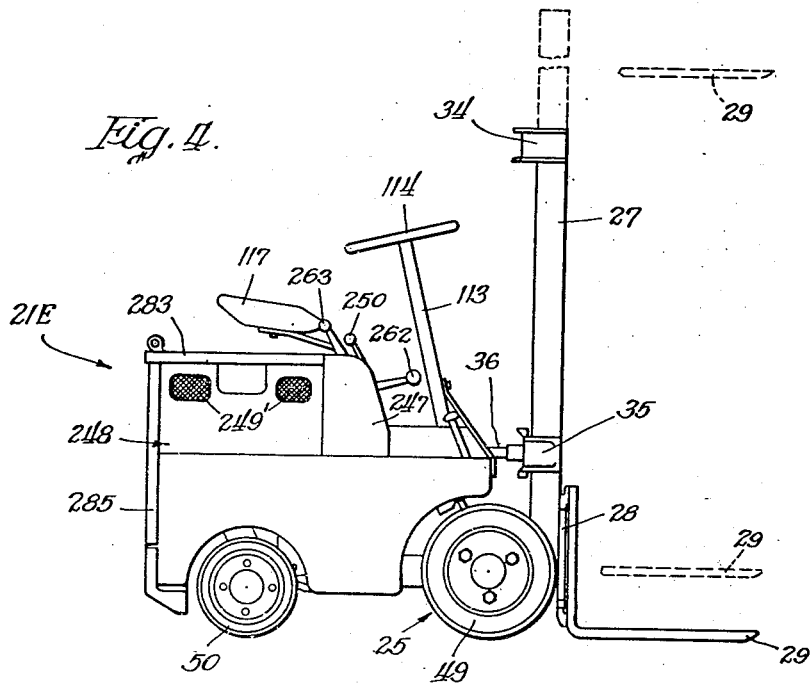

Aug. 2, 1949.                    E. J. DUNHAM                    2,477,789
                                INDUSTRIAL TRUCK
Filed Oct. 25, 1945                                          14 Sheets-Sheet 3
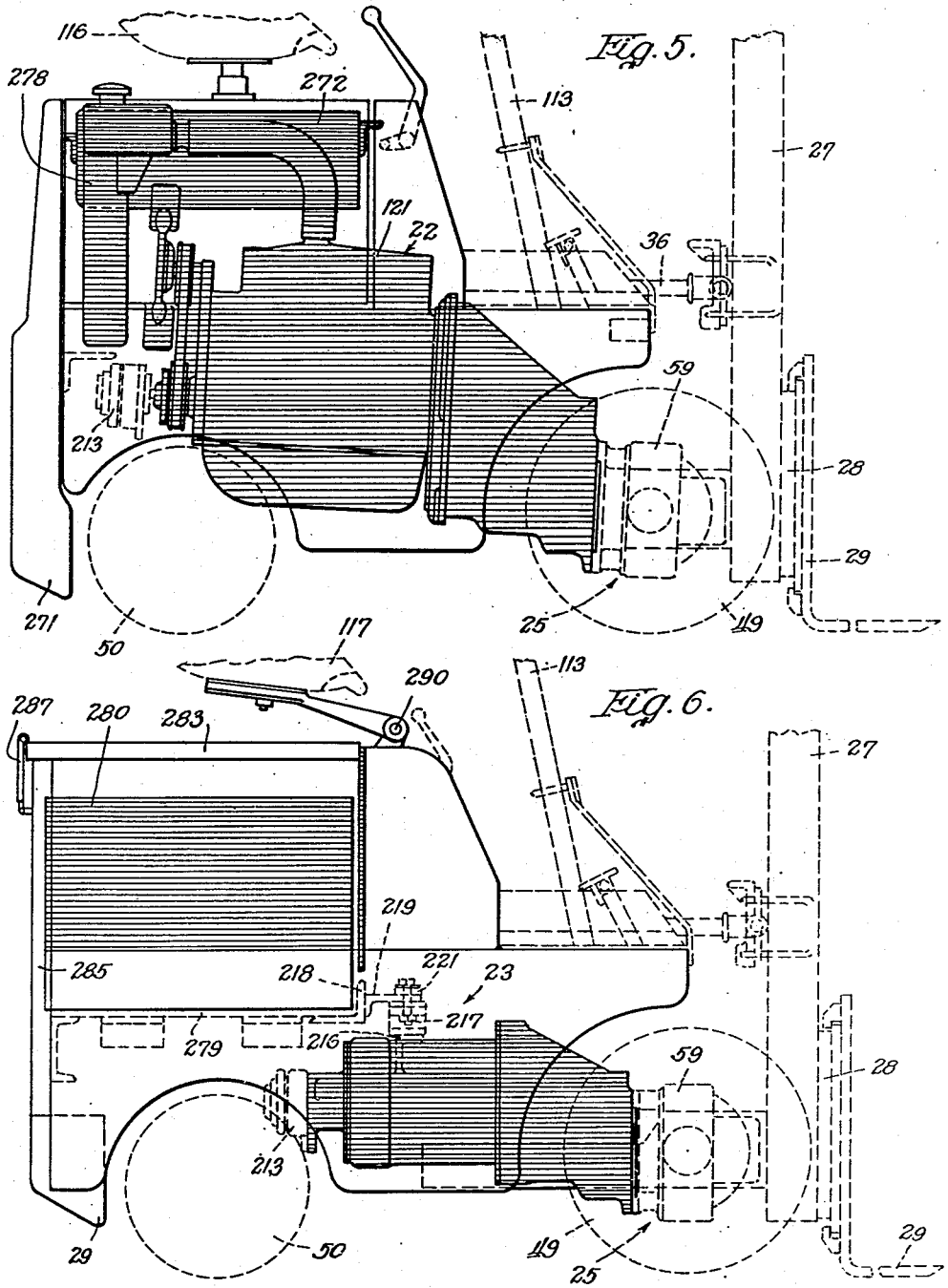
Inventor:
Elmer J. Dunham.

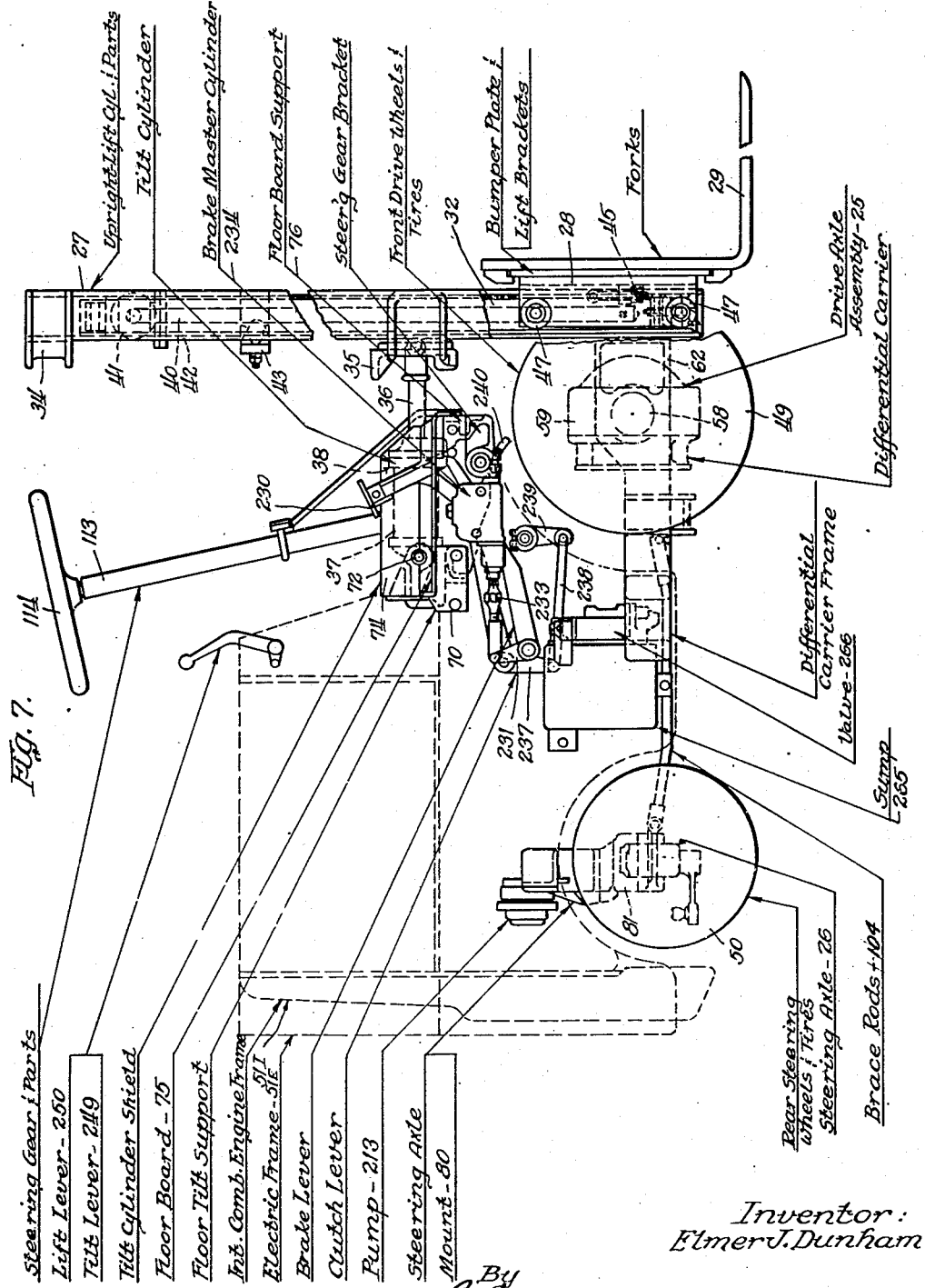

Aug. 2, 1949.  E. J. DUNHAM  2,477,789
INDUSTRIAL TRUCK
Filed Oct. 25, 1945  14 Sheets-Sheet 5
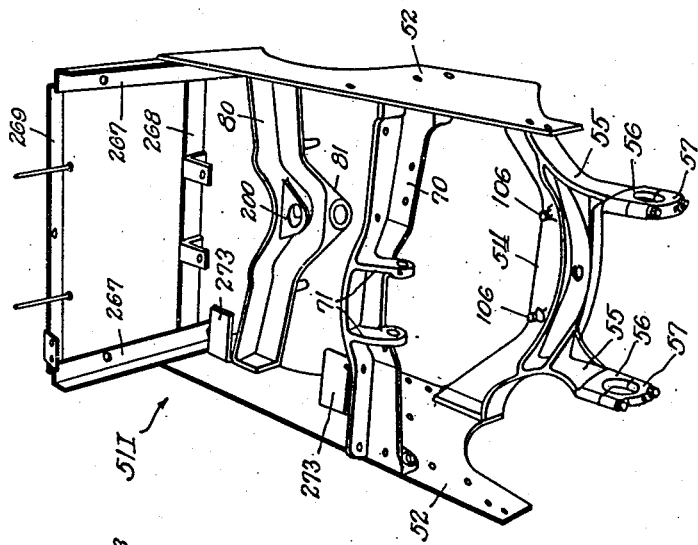
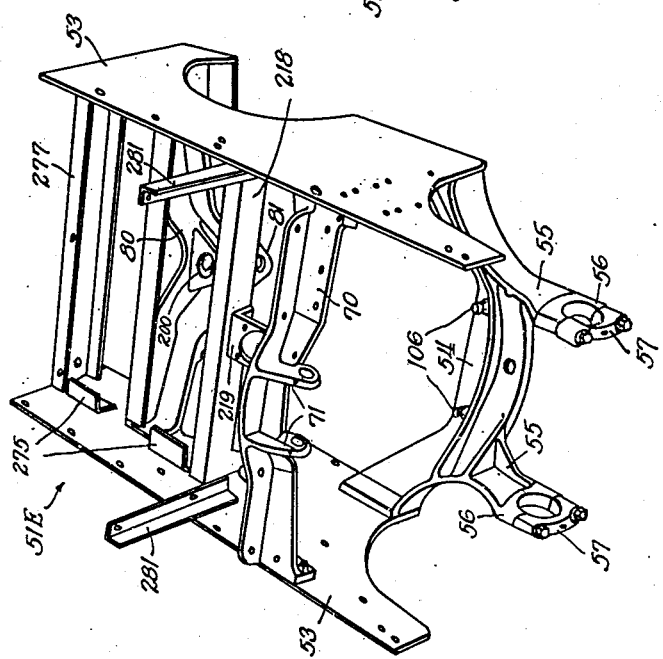
Inventor:
Elmer J. Dunham.
By Brown Jackson Boettcher Dienner
Attys Aug. 2, 1949.　　　　　E. J. DUNHAM　　　　　2,477,789
INDUSTRIAL TRUCK
Filed Oct. 25, 1945　　　　　　　　　　　　14 Sheets-Sheet 6
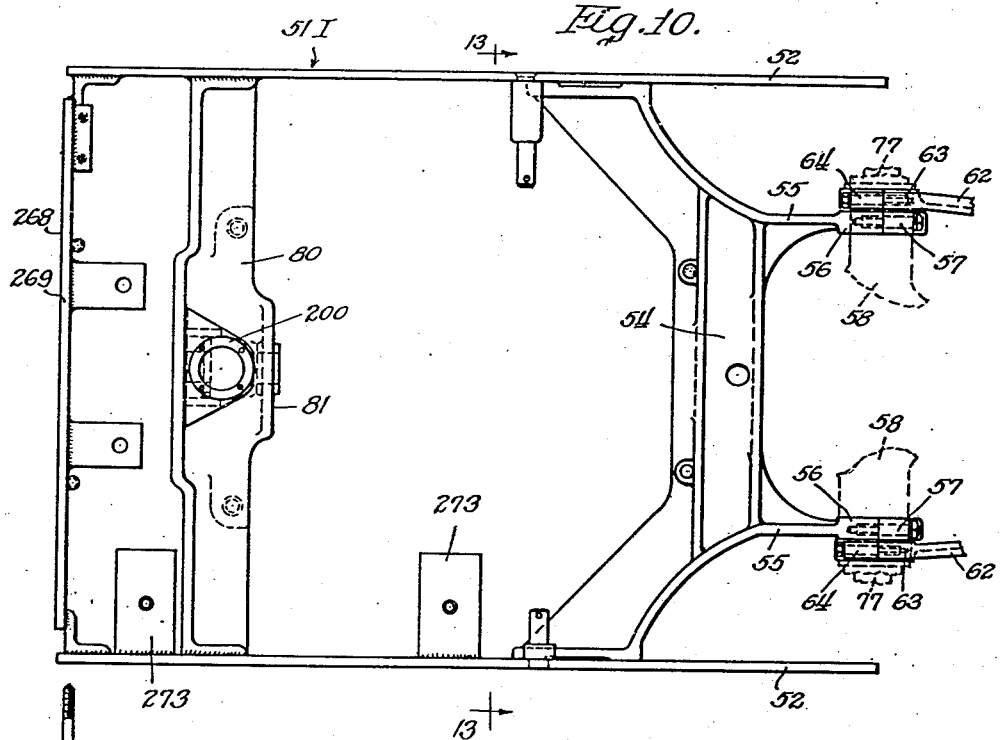
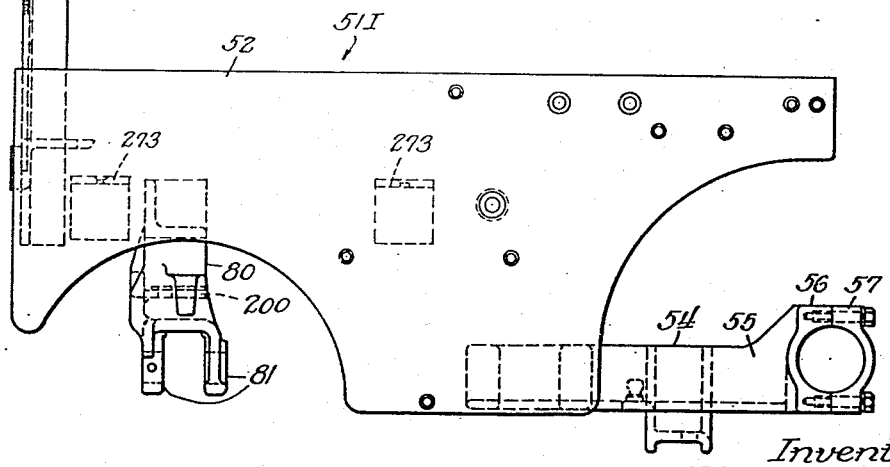
Inventor:
Elmer J. Dunham
By Brown Jackson Boettcher Dienner
Attys

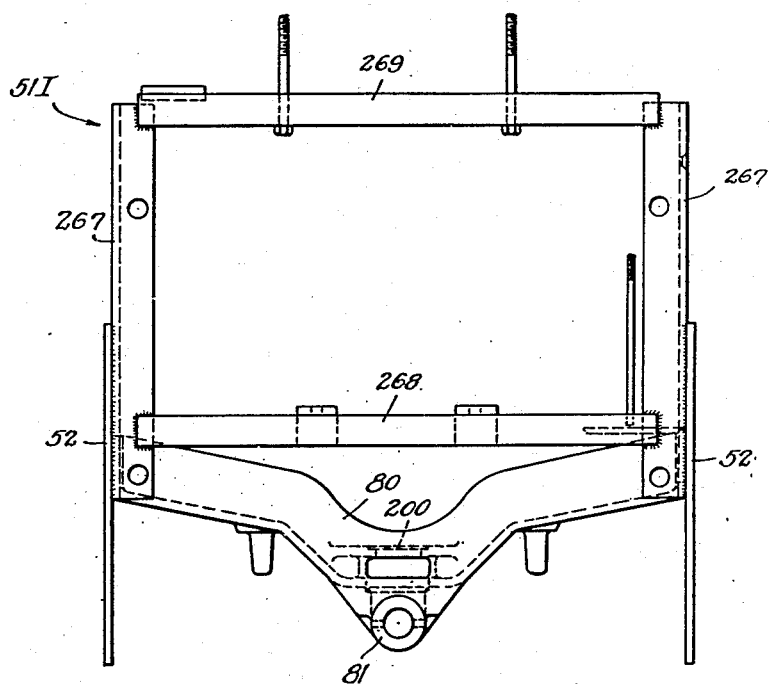
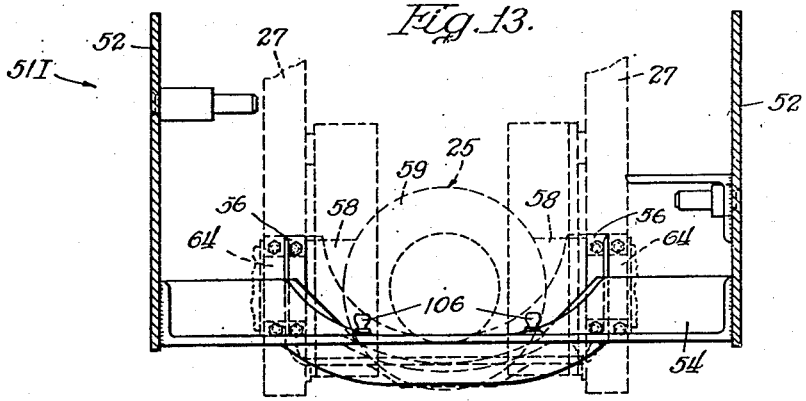

Aug. 2, 1949. E. J. DUNHAM 2,477,789
INDUSTRIAL TRUCK
Filed Oct. 25, 1945 14 Sheets-Sheet 8

Inventor:
Elmer J. Dunham

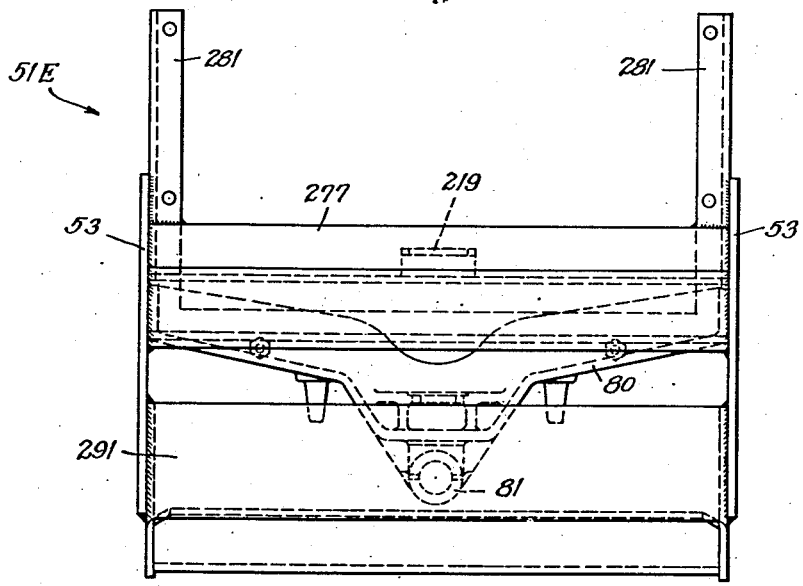
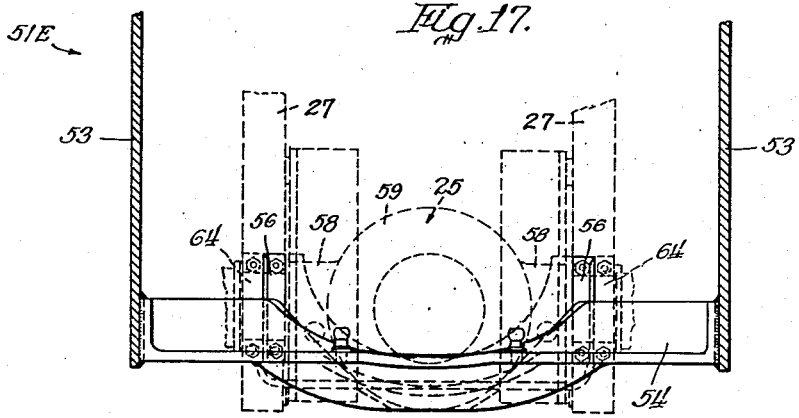

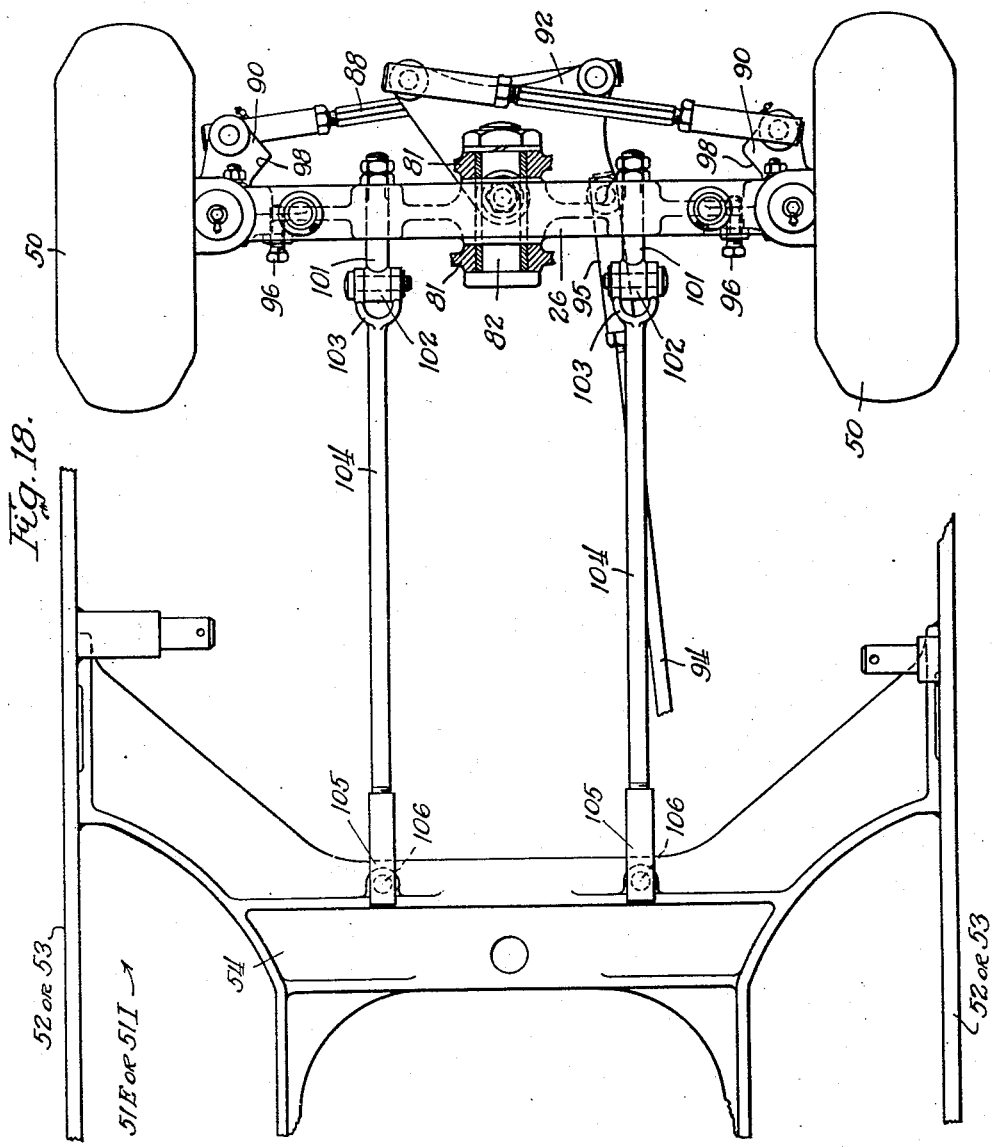

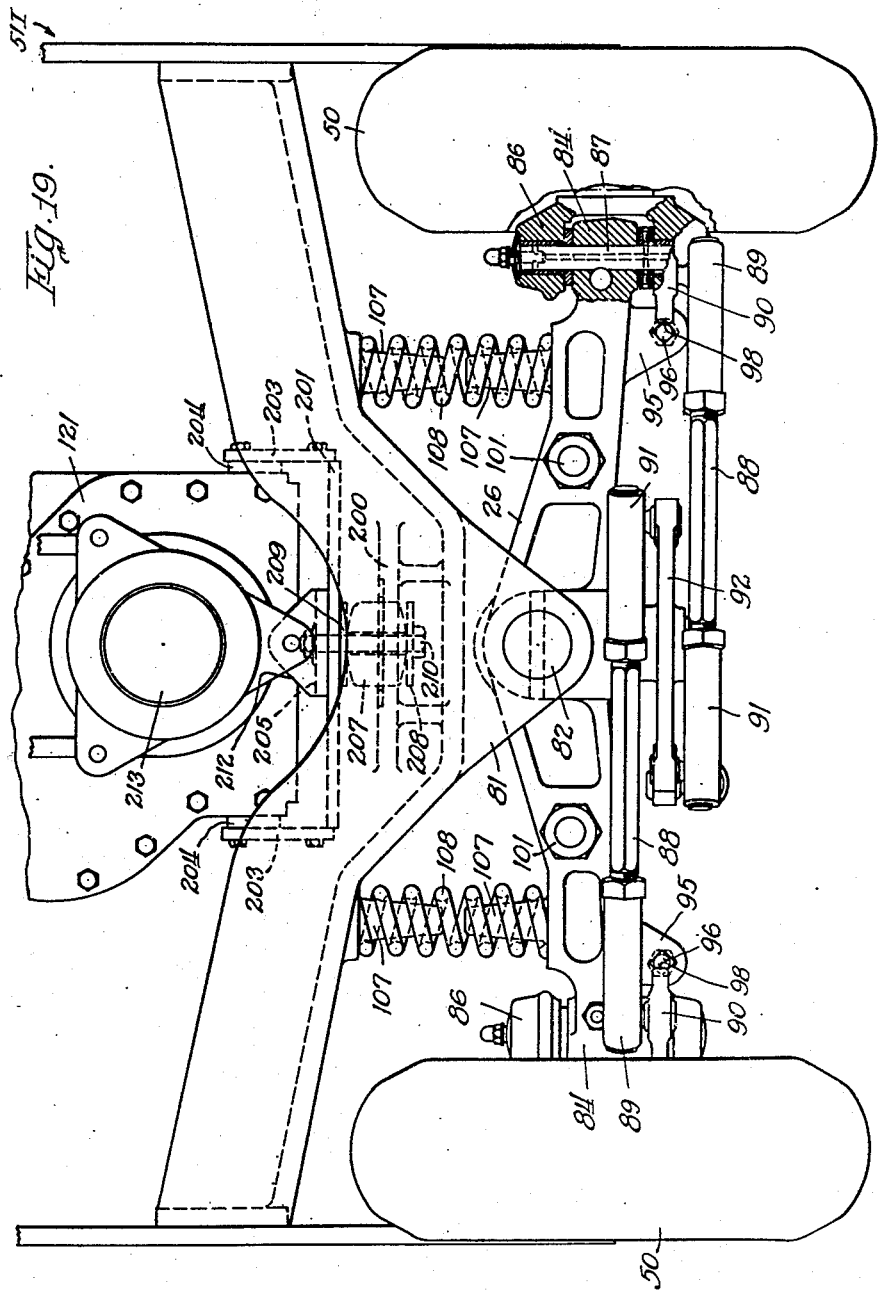

Aug. 2, 1949.  E. J. DUNHAM  2,477,789
INDUSTRIAL TRUCK
Filed Oct. 25, 1945  14 Sheets-Sheet 12
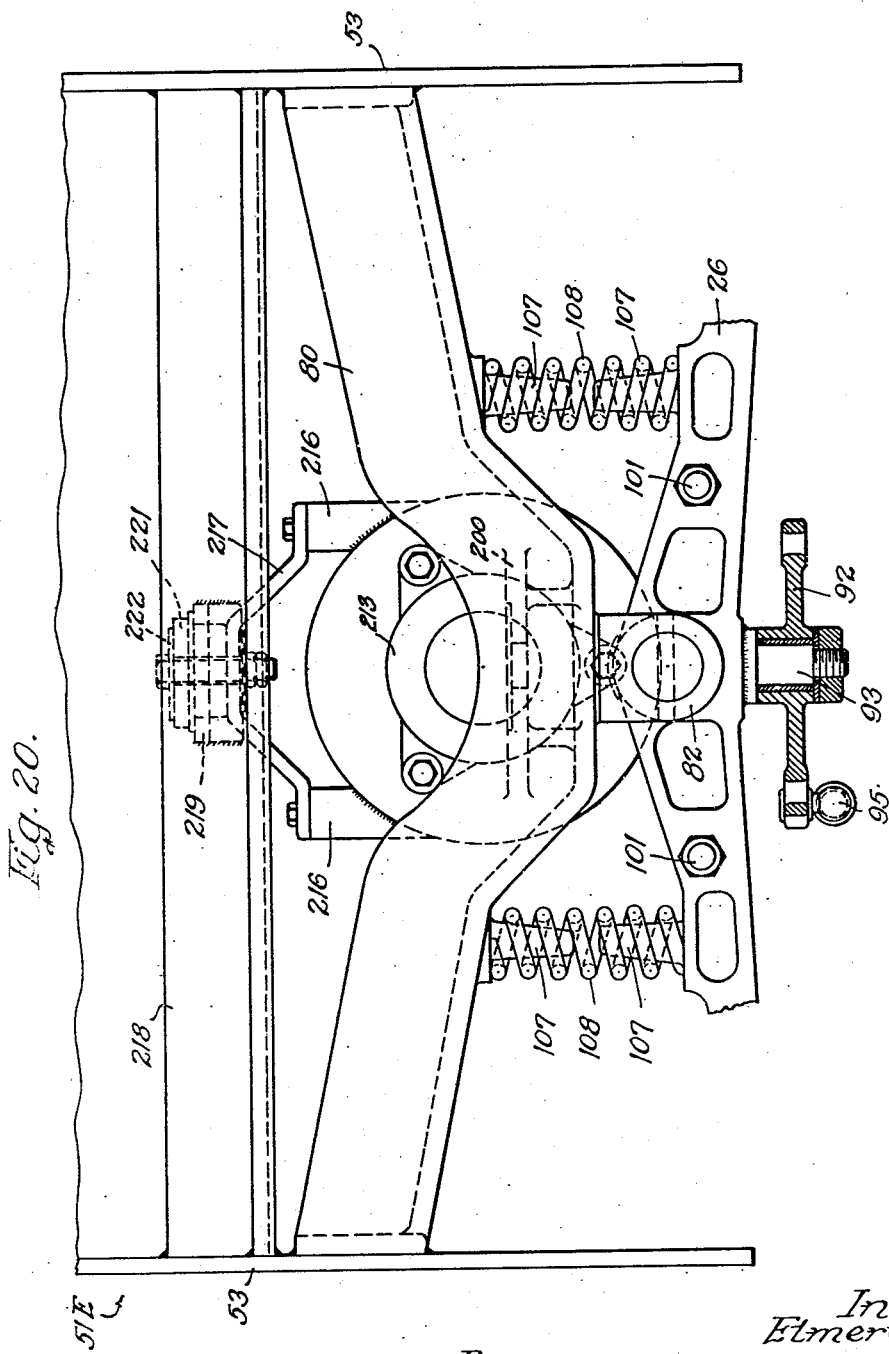
Inventor:
Elmer J. Dunham

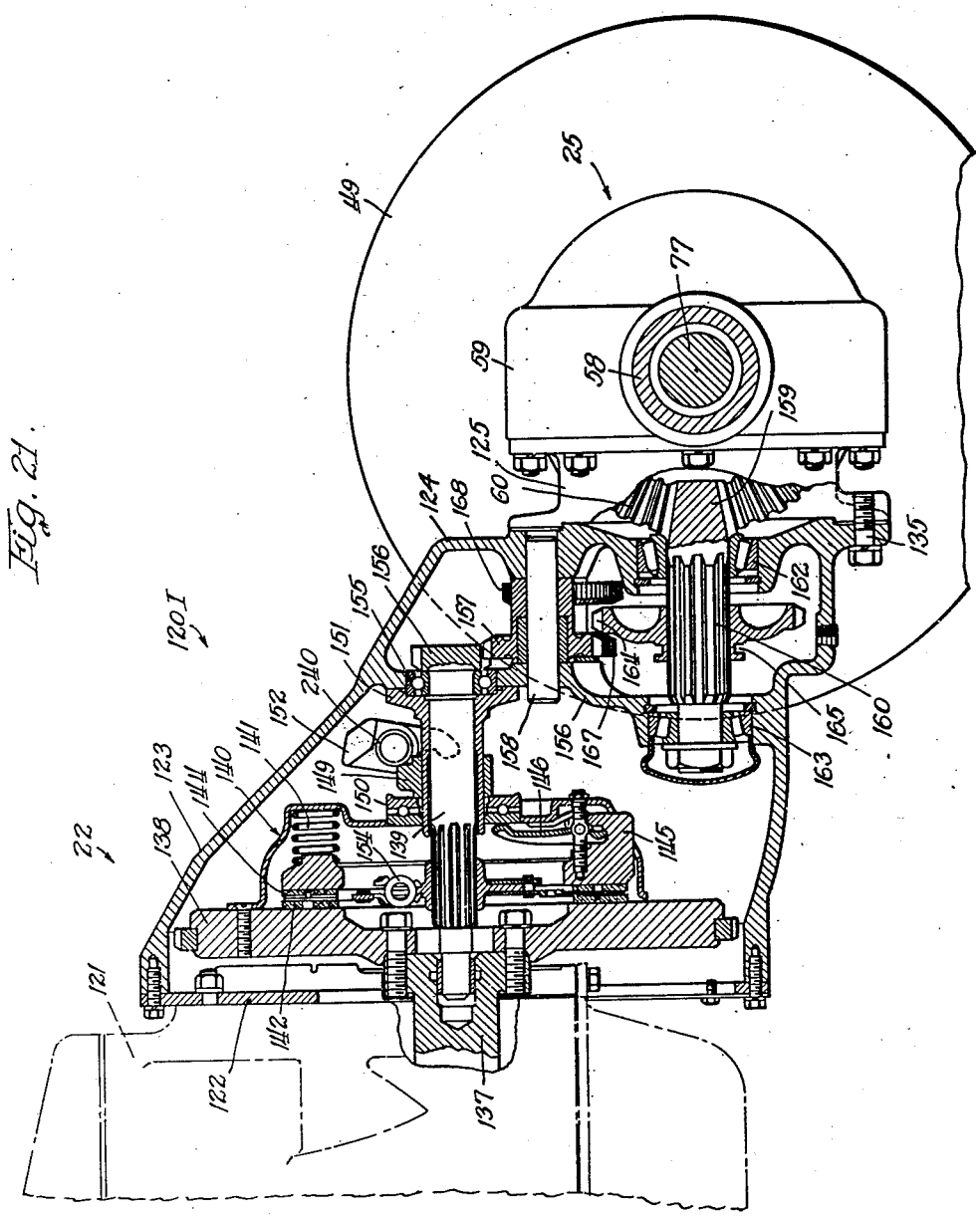

Aug. 2, 1949.  E. J. DUNHAM  2,477,789
INDUSTRIAL TRUCK
Filed Oct. 25, 1945  14 Sheets-Sheet 14

Inventor:
Elmer J. Dunham
By Brown Jackson Boettcher Dienner
Attys.

Patented Aug. 2, 1949

2,477,789

UNITED STATES PATENT OFFICE 2,477,789

INDUSTRIAL TRUCK

Elmer J. Dunham, Battle Creek, Mich., assignor to Clark Equipment Company, Buchanan, Mich., a corporation of Michigan Application October 25, 1945, Serial No. 624,477

5 Claims. (Cl. 180—54)

My present invention relates to an improvement in industrial trucks, and more particularly to industrial trucks of the type employed for picking up and transporting goods, wares, merchandise, etc., and tiering the same in warehouses, mercantile buildings, wharves, and the like.

Trucks of this general type are well known and have either been provided with internal combustion engine means or electric motor means as a source of motive power for propelling the same and effecting actuation of suitable pump means to provide fluid under pressure to control hydraulically the lifting and tiering means.

It has been the practice to design individually these two types of trucks from the standpoint of embodying either internal combustion engine means or electric motor means as the motive power source so that in the manufacture of the same separate dies, tools, etc., are required in the production of each. This duplication of manufacturing equipment unduly adds to the cost of the trucks thus manufactured.

It is an object of my present invention to overcome to a substantial extent the necessity of providing dual dies and tooling equipment, etc., in the production of lift trucks of the above type embodying selectively either of the above types of motive power means.

In my prior Patents No. 2,256,314, dated September 16, 1941, and No. 2,368,121, dated January 30, 1945, I have shown and described industrial trucks of the type with which my present invention is concerned, with the trucks of the above patents both embodying internal combustion engine means as the motive power source. This type of truck embodies an arrangement of parts wherein the driving wheels are at the forward end of the truck and the steering wheels are at the rearward end, and in which a drive axle assembly is arranged to extend transversely at the forward end for driving the driving wheels. Also, load raising and lowering means is arranged to extend forwardly of the truck with the drive axle assembly providing for pivotal mounting of the same to enable by means of suitable tilt cylinder assembly means to effect tilting of the load raising and lowering means facilitating the tiering of merchandise. The drive axle assembly in addition provides for pivotal mounting of the forward end of the main frame or chassis with the internal combustion engine means being disposed generally rearwardly of the truck and above the steering axle, which together with suitable counterweight means at the rearward end of the truck counterbalances loads on the load raising and lowering means. The arrangement of the internal combustion engine means in accordance with my present invention is in many respects similar to that of my patent last referred to, and with which in accordance with my present invention, I have provided a novel arrangement of parts whereby an electric motor means may be readily associated with the same parts or equipment as above described without requiring any changes in the latter. In the industrial truck of my present invention embodying an electric motor means as the source of motive power, I have provided an arrangement of parts thereof comprising an electric motor and transmission means including a clutch or coupling which is adapted to be assembled as a rigid integral unit with a common form of drive axle assembly in a manner similar to the arrangement therewith of an integral combustion engine means.

It is, therefore, a further object of my present invention to provide in an industrial truck as aforesaid, a drive axle assembly means which is adapted to have selectively associated therewith a rigid power unit comprising, selectively, either an internal combustion engine means or an electric motor means. More specifically it is an object to provide a drive axle assembly adapted to have selectively associated therewith internal combustion engine means or electric motor means, as aforesaid, in which the drive axle assembly is adapted to support in the same manner with either of the aforesaid motive power means assembled thereto, the main frame means for the trucks and of identical load raising, lowering and tilting means of either thereof.

The main frames of the two forms of motive power means for trucks of my invention are similar in most respects and provide for support in identical relation thereon suitable transversely extending cross frame members for pivotally mounting the same on a common drive axle assembly, and for pivotally supporting one end of tilt cylinder assembly means for tilting of the load raising and lowering means.

Further, it has been the general practice in this art to use leaf spring means for the support of the steering axle of the truck, and is a further object of my invention to provide a steering axle pivoted on a horizontal axis lying in the vertical longitudinal medial plane of the vehicle to readily facilitate movement of the truck over uneven ground or floors.

This improved axle arrangement also is of a nature providing for its common use with either internal combustion engine means or electrical motor means as the motive power source for the trucks with the aforesaid main frames for the two types of vehicles providing for the association therewith of a common form of steering axle supporting frame member. The axle supporting frame member is adapted to be secured to either of the main frame means of the two trucks in the same relation with respect to the driving axle assembly so that identical tie rod means, steering rod drag link, and other ancillary equipment may be of identical construction.

It is a further object of my invention to provide bracing means for the steering axle to maintain the axle in alignment and in which the common frame member for supporting the drive axle assembly is provided with means for anchoring the ends of the bracing means opposite the ends thereof having connection with the steering axle.

A further object of my invention is to provide steering means including a steering plate rotatably mounted on the steering axle about a vertical axis lying in the vertical longitudinal medial plane of the vehicle which has connection through suitable tie rods extending from the steering plate to the spindle means for rotatably supporting the steering wheels.

A further object of my invention is to provide a lift truck as aforesaid having electric motor means as the motive power source in which the electric motor thereof extends between spaced side walls of the main frame, which main frame rearwardly thereof and above the steering axle is provided with suitable brackets for supporting battery means for the electric motor, and which battery means serves to counterbalance a load on the load raising and lowering means at the forward end of the truck.

A still further object of my invention is to provide a lift truck as aforesaid having internal combustion engine means as the motive power source, in which the steering axle supporting frame serves to provide for support of bracket means to resiliently mount the end of the internal combustion engine means opposite the end associated with the drive axle assembly to provide a three point suspension of the power unit.

A still further object of my invention is to provide a lift truck as aforesaid having electric motor means as the motive power source, and in which a cross frame member extends transversely of the main frame of the vehicle to provide for support of bracket means to resiliently mount the electric motor of the electric motor means at the end of the unit opposite the end associated with the drive axle assembly, and which together with the pivotal mounting of the power unit on the drive axle assembly provides a three point suspension of the power unit.

Other objects and advantages of my invention will appear from the detail description.

Now, in order to acquaint those skilled in the art with the manner of constructing and utilizing industrial trucks in accordance with my invention, I shall describe in connection with the accompanying drawings certain preferred embodiments of my invention.

In the drawings:

Figure 1 is a plan view of an industrial truck constructed in accordance with my present invention and embodying internal combustion engine means as the source of motive power;

Figure 2 is a side elevational view of the truck shown in Figure 1;

Figure 3 is a plan view of an industrial truck constructed in accordance with my present invention which truck embodies electric motor means as the motive power source therefor;

Figure 4 is a side elevational view of the truck shown in Figure 3;

Figure 5 is a diagrammatic side elevational view of the truck of Figures 1 and 2 showing the general arrangement of the internal combustion engine means in the lift truck;

Figure 6 is a diagrammatic side elevational view illustrating the general arrangement of the electric motor means in the industrial truck of Figures 3 and 4;

Figure 7 is a side elevational view illustrating parts common to both industrial trucks of Figures 1, 2 and 5, and Figures 3, 4 and 6, with which arrangement of parts either the internal combustion engine means or the electric motive means may be associated to complete a lift truck;

Figure 8 is a perspective view of the main frame assembly of the industrial truck of Figures 1 and 2;

Figure 9 is a perspective view of the main frame assembly of the truck of Figures 3 and 4;

Figure 10 is a plan view of the main frame assembly of Figure 8 with the tilt cylinder supporting frame member being omitted for purposes of clearness;

Figure 11 is a side elevational view of the main frame assembly of Figure 10;

Figure 12 is a left hand end view of the main frame assembly of Figures 10 and 11;

Figure 13 is a detail vertical sectional view taken substantially on the line 13—13 of Figure 10 and looking in the direction indicated by the arrows;

Figure 16 is a left hand end view of the main frame assembly of Figures 14 and 15;

Figure 17 is a detail vertical sectional view taken on the line 17—17 of Figure 14 looking in the direction indicated by the arrows;

Figure 18 is a detail plan view of the steering means for either of the trucks of Figures 1 through 4, certain parts being shown in section, and illustrating the manner in which a pair of bracing rod means for the steering axle have common connection with a differential carrier frame member extending transversely of either of the main frame assemblies of Figures 8 and 9;

Figure 19 is a rear end view of the industrial truck of Figures 1 and 2 and showing the end view of the steering means of Figure 18 which is common to the lift trucks of Figures 1 through 4;

Figure 20 is a partial rear end view of the industrial truck of Figures 3 and 4 showing the position of the electric motor in the main frame assembly of Figure 9, and illustrating the common steering axle supporting means for the two types of trucks shown in Figures 1 through 4, and with the steering plate for effecting steering of the steering wheels of the vehicles being shown in section;

Figure 14:
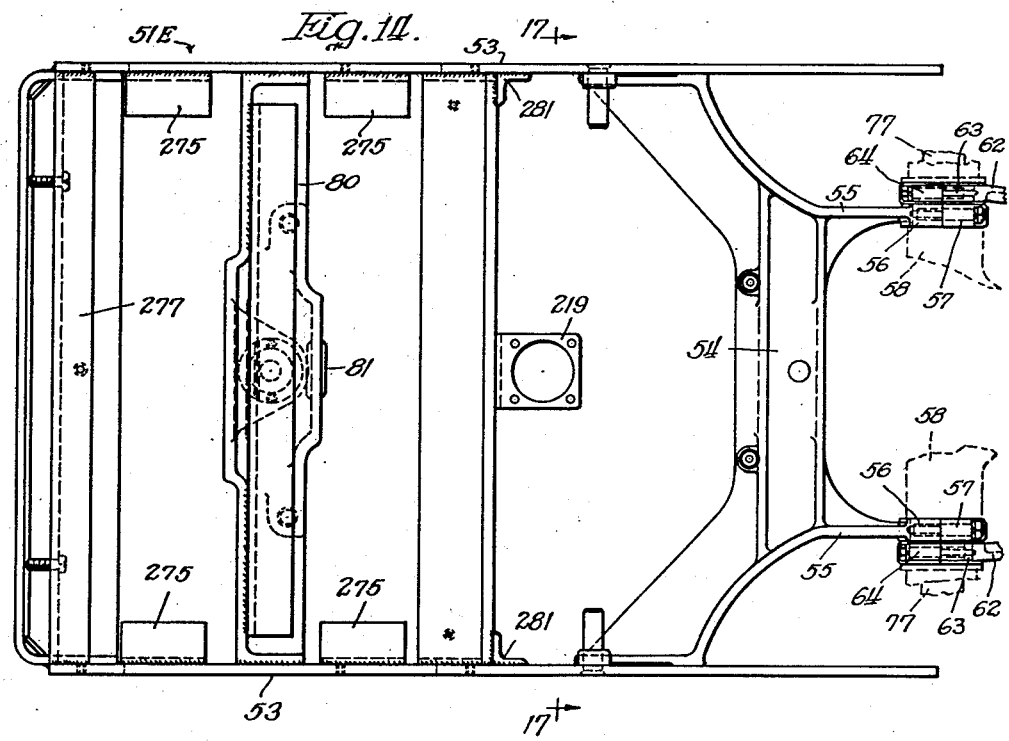
Figure 14 is a plan view of the main frame assembly of Figure 9 with the tilt cylinder supporting frame member omitted for purposes of clearness.
Figure 15:
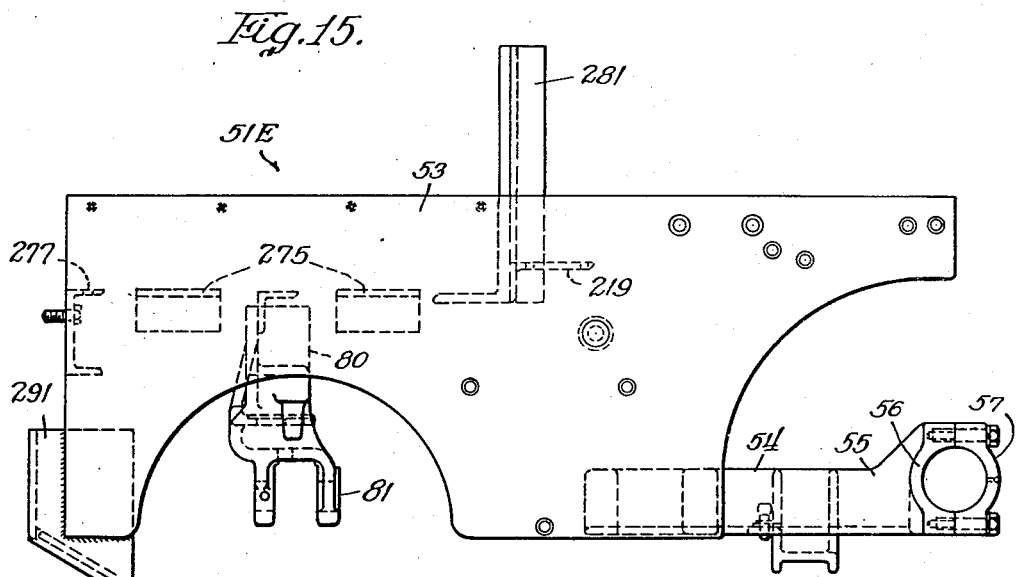
Figure 15 is a side elevational view of the main frame assembly of Figure 14.

Figure 21 is a detail vertical sectional view through the transmission means of the internal combustion engine means of the truck of Figures 1 and 2, with a portion of the internal combustion engine thereof being shown in dotted lines, and showing the manner in which the internal combustion engine means is mounted on a drive axle assembly common to both types of trucks illustrated in Figures 1 through 4; and Figure 22 is a vertical detail sectional view through the transmission means arranged between the electric motor of the electric motor means forming the motive power source of the industrial truck of Figures 3 and 4, illustrating the mounting thereof with respect to a common drive axle assembly for the two types of industrial trucks of Figures 1 through 4, and with a portion of the electric motor and other ancillary parts of the truck being shown in dotted lines.

In Figures 1 and 2 of the drawings I have shown an industrial truck 21I having motive power means comprising an internal combustion engine means shown generally at 22 in Figure 5, and in Figures 3 and 4 a second form of industrial truck 21E having motive power means comprising an electric motor means indicated generally at 23 in Figure 6. In the detail description following hereinafter, the like reference numerals applied to the several parts of the lift trucks of Figures 1, 2 and 5, and of Figures 3, 4 and 6 indicate identical parts, which parts are arranged in the same relation with respect to each other in either of the two forms of trucks in which my present invention is embodied. The parts common to both trucks are shown in Figure 7 in the relation thereof with each other when either the internal combustion engine means 22 or the electric motor means 23 is associated therewith to provide the two types of lift trucks of Figures 1 and 2, and Figures 3 and 4.

It will be observed that the lift trucks of Figures 1 through 6 comprise a front drive axle assembly 25, a steering axle 26 shown more clearly in Figures 7, 19 and 20, and spaced supporting frame channel uprights 27—27 disposed forwardly of the drive axle assembly 25. The uprights 27—27 and the load raising and lowering means associated therewith are of known construction, and may, for example, embody the construction shown in my prior Patent No. 2,368,121, above referred to, in which the latter as more clearly shown in Figure 7 comprises a load supporting carriage 28 having a bumper plate carrying lift fingers or forks 29 which are adapted to be engaged under a load to receive the load thereon, and through suitable hydraulic mechanism comprising the ram and cylinder means 32 arranged between the uprights 27—27 for raising the forks 29, the uppermost position of which is shown in dotted lines of Figures 2 and 4.

The uprights at their upper ends are connected together by a cross frame member 34 providing for rigidly spacing the uprights at their upper ends, which uprights intermediate their ends are provided with a second cross frame member 35 upon which is pivotally mounted a rod 36, the other end of which is connected to a piston (not shown) contained within the cylinder 37, which rod 36 and piston therefor, together with the cylinder 37, form parts of the tilt cylinder assembly means 38 adapted to be suitably actuated through a hydraulic system to produce tilting movement of the uprights forwardly or rearwardly as is well known in the art and which will be referred to in greater detail hereinafter.

The ram 40 of the cylinder and ram means 32 disposed within the pair of uprights 27 has connection at its upper end with a cross head member having laterally spaced sprockets 41 only one of which is shown in the side elevational view of Figure 7 and over which chains or other similar tension members 42 are trained. The chains are anchored at one end to a cross member 43 extending transversely of and secured to the rear edges of the uprights 27—27 intermediate the ends thereof, and at their opposite ends are connected to the carriage 28 as shown at 45. The carriage 28 is provided at each side thereof with a pair of rollers 47 which are adapted to be guided in the channels of the uprights 27—27 in the raising and lowering of a load supported on the forks 29. This general arrangement of a pair of upright members, such as the members 27—27, together with ram and cylinder means disposed therebetween and associated with fork means to raise and lower a load together with the tilting assembly means 38, as above noted, is of known construction and it is believed that a further detailed description thereof is not necessary for purposes of my present invention.

The two types of trucks illustrated in Figures 1 through 6, each have front drive wheels 49—49, and rear steering wheels 50—50, which wheels may be provided either with solid rubber tires or pneumatic tires as desired.

Referring now more particularly to Figures 8 through 17, it will be seen that I have provided two main frame assemblies 51I and 51E for the lift trucks shown in Figures 1 and 2, and Figures 3 and 4, respectively, which main frame assemblies are similar in most respects in that each comprises a plurality of identical transversely extending frame members arranged in the same spaced relation with respect to each other on each of the main frame assemblies for supporting in the same manner and in the identical relation the ancillary equipment for each of the two forms of trucks, as shown in Figure 7, whereby the ancillary equipment for attachment to the main frame assemblies 51I and 51E may be of identical construction, and thus providing for the use of many duplicate parts in the construction of either of the two types of powered trucks of my invention.

It will be observed that the main frame assembly 51I comprises a pair of spaced vertical side walls 52, 52 and that the main frame assembly 51E comprises a pair of vertically spaced side walls 53—53. The main frame assemblies each include a differential carrier frame member 54 suitably secured, as by welding, to the lower forward portions of each of the spaced side walls 52—52, 53—53, to extend transversely thereof. The differential carrier frame 54 comprises forwardly extending arm portions 55, the outer ends of which are formed with forwardly projecting bearing brackets 56, 56 which together with the bearing caps 57, 57 provide for pivotally mounting of the forward ends of the main frames 51I and 51E, as shown more clearly in Figures 10 and 13, and Figures 14 and 17, respectively, about the laterally extending axle housing arms 58, 58 of the drive axle assembly 25. The drive axle assembly 25, as shown in Figures 21 and 22, comprises a differential housing 59 in which the ring gear 60 is suitably arranged in a known manner with the differential housing 59 being disposed forwardly of the main frame assemblies 51I and 51E of the two types of trucks and from which the axle housing arms 58—58 extend laterally and oppositely of each other to provide for the aforesaid pivotal mounting of the forward ends of the main frame assemblies. The laterally extending axle housing arms 58, 58 also provide for the pivotal support of the pair of spaced uprights 27—27, which uprights 27—27, at their lower ends, are provided with rearwardly extending arm portions 62, 62, as shown in Figures 7, 10 and 14. The arms 62—62 at their free ends are formed with bearing brackets 63, 63 which with the bearing caps 64, 64 provide for the aforesaid pivotal mounting of the uprights 27, 27 upon the axle housing arms 58—58. It will be observed that the bearing brackets 63—63 and the bearing caps 64, 64 therefor are disposed laterally outwardly of the bearing brackets 56—56 and the associated bearing caps 57, 57 to provide for the aforesaid pivotal mountings of the forward ends of the main frame assemblies and for the pivotal mounting of the uprights 27—27, which by means of the tilt assembly means 38 tilting of the load raising and lowering means may be effected.

The main frame assemblies 51I and 51E, as shown in Figures 8 and 9, also have suitably secured thereto a transversely extending tilt cylinder frame supporting member 70 between the upper ends of the spaced side walls thereof which is formed with a pair of spaced integral forwardly projecting journal lugs 71—71 for receiving and supporting the opposite ends of a pivot pin 72 (see Figure 7) extending through an opening formed in the end cap member of the tilt cylinder 37 to provide for pivotal movement of the rearward end of the tilt cylinder. It will be observed from Figure 7 that the tilt cylinder extends above the forwardly projecting upper ends of the side walls of the main frame assemblies 51I and 51E lying substantially in the longitudinal vertical medial plane of the truck with the tilt cylinder 37 being enclosed within a substantially rectangular tilt cylinder housing 74 projecting upwardly above a floor board 75 which is suitably secured to the supporting frame 70 and a floor board supporting frame 76 extending transversely between the upper forward portions of the side walls of the main frame assemblies.

Also it will be undestood that the axle housing arms 58—58 of the drive axle assembly 25 have driving axles 77—77 extending therethrough which have connection with the driving wheels 49, 49 in a known manner. Reference may now be had again to Figures 8 and 9 in which it will be observed that the main frame assemblies 51I and 51E each comprise an axle supporting frame member 80 suitably secured at its opposite ends to the spaced vertical side walls of the main frame assemblies to extend transversely of and adjacent the rearward ends thereof. As best illustrated in Figure 7, the axle supporting frame 80 is arranged on each main frame assembly in the same spaced relation with respect to the drive axle assembly 25 in teh two types of powered vehicles. The axle supporting frame 80 centrally thereof is provided with a depending journal yoke member 81 in which, as best seen in Figures 18, 19 and 20, the axle 26 is pivotally mounted centrally thereof on a horizontal axis lying in the lengthwise vertical medial plane of the truck, about the pivot bolt 82. As shown in Figure 19, the steering axle 26 is provided with journal portions 84 at its outer ends through which king bolts 87 extend, which king bolts rotatably support spindles 86—86 having the steering wheels 50—50 mounted thereon. The pair of spindles 86, 86 are interconnected through a pair of tie rods 88—88 between the outer ends of which and the spindle knuckles 90—90 ball and socket connecting means 89—89 are provided. The other or inner ends of the tie rods 88—88 have connection with a steering plate 92 through ball and socket means 91—91 therebetween. The steering plate 92 is pivotally mounted for rotation about a bolt member 93 depending centrally of and welded to the axle 26. As shown in Figure 18 a drag rod 94 has connection with the steering plate 92 through ball and socket means 95 for rotating the same about its vertical axis on the axle 26, which rotation of the steering plate 92 effects steering of the steering wheels 50, 50 through the connection thereof by the tie rods 88, 88 with the spindle members 86—86. The axle 26 adjacent the outer ends thereof is provided with a pair of depending lugs 95, 95 in each of which a set screw 96 is threaded and against which the end surfaces 98 of the spindle knuckles 90 are adapted to abut to limit turning of the steering wheels 50—50. A pair of brace rod means for maintaining the axle 26 in transverse alignment each include a bolt member 101 suitably secured in the axle 26 at either side of the horizontal pivotal axis thereof, which bolt members 101 are each formed at their forward ends with a bearing boss 102 having pivotal connection with the yokes 103 of the rods 104—104 extending generally forwardly of the vehicle, and which rods 104—104 at their forward ends have connection with the differential carrier frame 54 by ball and socket connecting means 105—106 therebetween. Also, the axle supporting frame 80 and the steering axle 26 at either side of the vertical longitudinal medial plane of the vehicle are formed with integral opposed truncated bosses 107—107 between each opposed pair of which a coil spring 108 is disposed to provide a snubbing means for absorbing the shocks imparted to the wheels 50, 50 in passing over uneven ground or floors.

As illustrated in Figure 22, the drag rod 94 has conventional connection by a ball and socket means 110 to the lever arm 111 of a worm wheel steering gear means enclosed within gear housing 112 associated with the lower end of the steering column 113 which, as shown in Figures 1 through 4 and 7, has a steering wheel 114 disposed at its upper end in a position to be conveniently grasped by an operator seated in seats 116 or 117 of the two forms of trucks disclosed. The seats 116 and 117 are arranged to dispose the weight of the operator substantially above the steering axle for the truck and in convenient position for the operator to steer the vehicle by the steering wheel 114.

Referring now more particularly to Figures 21 and 22, it will be seen that I have provided two motive power means 120I and 120E with the unit 120I being the internal combustion engine motive power means of my present invention, and the unit 120E being the electric motor means providing the motive power for the trucks of my invention. Referring more particularly to Figure 21, the internal combustion engine motive means 120I comprises a conventional internal combustion engine 121 having a rearwardly extending flange 122 to which the transmission housing 123 is rigidly bolted. It will be observed from Figure 5 that the internal combustion engine means 22 is arranged reversely of the vehicle with the forward end of the internal combustion engine 121 being disposed rearwardly of the truck. The forward end of the transmission housing 123 is provided with an end wall 124 formed for piloting engagement with the removable end cover 125 of the differential housing 59 of the drive axle assembly 25 in which the piloted end of the transmission housing is secured as a rigid unit to the cover member 125 of the differential means 59 by a plurality of bolts 135. It will thus be observed that the internal combustion engine means 22 comprising the internal combustion engine 121, and the transmission means 123 forms a rigid unit with the differential housing 59. The internal combustion engine 121 has the crank shaft 137 thereof suitably connected to the flywheel 138 between which and a clutch shaft 139, clutch means 140 of known construction is provided for normally clutching the shaft 139 with the crank shaft 137. As above related, clutch means 140 is of known construction and comprises in general an annular friction disk 142 carried by the flywheel 138, and an annular friction disk 144 carried by the clutch disk 145 normally urged by spring means 141 into engagement with the annular disc of vibration dampening means 154 between the friction disks to clutch the shaft 137 with shaft 139. A clutch lever 152 carried by rock lever 240 is adapted to engage the clutch collar member 149 carried on a sleeve 151 for axial sliding movement thereon, and in which the thrust bearing 150 at one end of the clutch collar member is adapted to engage spring finger means 146 upon movement to the left, as viewed in the drawing, to effect disengagement of the friction discs 142 and 144 with the intermediate friction ring of the vibration dampening means to disengage the clutch means. The clutch shaft 139 is journaled at its opposite ends in a bearing sleeve supported within the inwardly extending bore of the crank shaft 137 and at its outer end in a bearing race assembly 155 carried within the intermediate transversely extending wall 156 of the transmission housing 123. The outer end of the clutch shaft 139 has a gear 156 preferably formed integrally therewith which has meshing engagement with a gear 157 journaled on a shaft 158 supported at its opposite ends in the transverse wall 156 and the end wall 124 of the transmission housing. A pinion 159 formed integrally of a pinion shaft 160 has meshing engagement with the ring gear 60 for driving the drive axles 77—77 of the differential means 59. The pinion shaft 160 is journaled for rotation at its opposite ends in tapered bearing races 162 and 163 supported in the transverse wall 156 and the end wall 124 of the transmission housing. A gear 164 formed with a shift collar portion 165 is splined to the pinion shaft 160 and is adapted to be shifted axially thereof to engage the gear 164 with the gear 157 whereupon the truck is driven in a forward direction. The gear 157 also has meshing engagement with a gear 167 suitably supported for rotation on a lay shaft (not shown) and which gear 167 has a reverse gear 168 formed integrally therewith and with which the gear 164 is adapted to have meshing engagement upon shifting thereof to the right, as viewed in Figure 21, to effect reverse drive of the truck.

Referring now to Figure 22 it will be observed that the electric motive power means 120E comprises an electric motor 170 between which and the differential housing cover member 125 a transmission means 171 is arranged. The end wall 172 of the electric motor 170 is adapted to have rigid connection with the housing 173 of the transmission means 170 as by a plurality of bolts 174, and the transmission housing 173 at its other end is provided with an end wall 175 formed to have piloting engagement with the differential housing cover member 125 in the identical manner as the end wall 124 of the transmission housing 123 of the internal combustion engine means above described in connection with Figure 21. The electric motor 170 comprises an armature shaft 176 which is suitably journaled in a ball bearing race 177 supported in the end wall member 172 thereof, and the armature shaft has splined to its outer end a flywheel 178 which is provided with an annular friction ring 179. A clutch plate 180 is also provided with an annular friction ring 181 with the clutch plate 180 being shiftable axially on a clutch shaft 182 by means of a clutch collar 183 shiftable axially on a sleeve 184 supported on a transverse intermediate wall 185 of the housing 173. Thrust bearing means 187 is associated with the clutch collar 183 and is adapted to engage the finger means 188 for urging the clutch plate 180 and the friction ring 181 thereof away from the intermediate annular clutch disc 189 to disengage the armature shaft 176 from clutch shaft 182. As shown in the drawing the clutch or coupling includes spring means 186 for normally maintaining the clutch engaged. The clutch shaft 182 is suitably journaled at one end in a bearing means supported in a bore formed in the end of the armature shaft, and at its opposite end in a ball bearing race 190 supported within the transverse intermediate wall 185. The outer end of the clutch shaft 182 like the clutch shaft 139 of the embodiment of Figure 22 is provided with a gear 192 having meshing engagement with the gear 164. It will be observed that the gears 164 are identical in both embodiments of my invention except that the gear in the present instance is arranged in reverse relation on the pinion shaft 160, and that it has continuous meshing engagement with the gear 192 at the outer end of the transmission of the clutch shaft 182. As before, the gear 164 is splined to the differential pinion 160 but it is restrained against axial movement therealong. As before, the pinion 159 at the end of the pinion shaft 160 has meshing engagement with the ring gear 60 of the differential 59 and the pinion shaft 160 is journaled for rotation in tapered bearing assemblies 162 and 163 supported in the intermediate wall 185 and the end wall 175 of the housing 173. As previously, the piloted end of the housing 173 and the end cover member 125 of the differential housing 59 are rigidly assembled together as by means of a plurality of bolts 135 extending through radially outwardly extending flanges of these members.

It is to be observed that the transmission means 171 for the electric motive power means does not include reverse gear means in that reversing of the truck is accomplished by suitable control device for changing the polarity of the electric motor 170 for this purpose.

Referring now more particularly to Figures 8 and 19, it will be seen that the axle supporting frame member 80 is formed with a central forwardly extending integral flange 200 above which a transverse frame member 201 secured to the internal combustion engine 121 extends. The frame member 201 comprises side arm members 203—203 which are bolted to bosses 204—204 formed integrally with the block of the internal combustion engine 121. A rubber block 207 is mounted between a pair of washers 208 and 209 through which and the flange 200, the frame member 201 and the flange of a bracket 205, bolt 210 extends to provide a resilient mounting of the forward end of the internal combustion engine. The bracket 205 is formed with a vertically upwardly extending flange 212 for supporting the frame of a hydraulic pump 213, which pump 213 has connection with the crank shaft of the engine for delivering fluid under pressure through conduit means (not shown) to the tilt valve assembly 38, and the upright cylinder assembly 32 for the load raising, lowering and tilting means forwardly of the truck. The internal combustion engine rigid power unit is thus provided with a resilient mounting at the forward end of the engine rearwardly of the truck between the engine and the axle supporting frame, with the unit being supported by the driving wheels 49—49 at the forward end of the truck through the axle housing arms of the drive axle assembly providing for the pivotal support of the forward end of the main frame assembly 51I so that the motive unit and the main frame are movable with respect to each other and in which the aforesaid mounting means in effect provides a three point suspension of the motive power unit.

Referring now to Figures 6 and 20, it will be observed that the housing of the electric motor 170 has integral mounting lugs 216—216 to which the opposite ends of a transversely extending bracket 217 are secured. An angle iron frame 218 (see Figures 9 and 20) is suitably secured to the side walls 53—53 of the main frame assembly 51E, which angle iron frame has suitably secured thereto, as by welding, an angle iron bracket 219 formed with a forwardly and horizontally extending flange overlying the upper end of bracket 217 fixed to ears 216—216. A rubber block means 221 is provided above the upper end of the bracket 219, and a washer 222 through which washer, bracket 219 and bracket 217 a bolt extends to provide a resilient mounting means for the electric motive power unit, the other end of which is mounted with respect to the differential housing of the drive axle assembly 25, as above described to provide a three point mounting of the electric motor motive power means in the main frame assembly 51E of the truck of Figures 3 and 4. The pump 213 for supplying fluid under pressure to the tilt assembly means 38, and the piston and cylinder means 32 has connection with the end of the armature shaft of the electric motor extending rearwardly of the truck. The pumps 213 for both forms of trucks are identical and are of known construction and it is believed need not be described further for purposes of my present invention.

Referring now to Figure 7, I shall briefly describe the remainder of the parts which are common to both forms of lift trucks shown in Figures 1 and 2 and Figures 3 and 4. The above two types of powered trucks are each provided with brake levers or pedals 230 extending upwardly of the floor board 75 through a suitable formed opening therein. The brake lever 230 has connection with a lever 231, the opposite end of which has pivotal connection with a control lever 233 extending to a master brake cylinder for effecting actuation of hydraulic brakes associated with the driving wheels 45, 45 in a known manner. The brake lever 230 is positioned to the operator's right hand side when seated upon the seat of the vehicle and to one side of the rectangular housing 74 for the tilt cylinder. A clutch lever or pedal 236 also extends through a suitable opening formed in the floor board 75 and has connection through levers 237 and rod 238 to clutch lever 239 clamped to the clutch rock lever 240, which clutch rock lever 240 has connected thereto the clutch collar shifting members of the clutch means of the transmissions of Figures 21 and 22. Depression of the clutch pedal 236 in either of the two forms of trucks of Figures 1 and 2 and Figures 3 and 4, effects disengagement of the gear reduction means between the differential housing and the clutch means of the transmission of the two devices at the selection of the operator.

In both forms of trucks disengagement of the clutch means of the transmissions thereof is effected when it is desired to interrupt drive to the driving wheels 49—49 with the electric motor means or the internal combustion engine means continuing to drive the pumps 213 to effect control of the load raising, lowering and tilting means.

The trucks are also provided with appropriate enclosing hood means which in the truck of Figures 1 and 2 comprises an enclosing instrument housing 245 forwardly of the hood means 246 which hood means comprises side panels having openings therein for cooling purposes. Likewise the lift truck shown in Figures 3 and 4 comprises a control or instrument panel housing 247 and hood enclosing means 248 likewise formed with ventilating openings 249'.

The instruments enclosing panels 245 and 247 have upwardly tilt and lift valve levers 249 and 250 extending upwardly therethrough, respectively, positioned to the right of the operator when seated on the vehicle. The truck of Figure 1 is also provided with a gear shift lever 260 having connection with yoke means for shifting of the gear 164 axially of the pinion shaft 160, as shown in Figure 21, to effect selection of neutral, forward or reverse drive. It will be observed that the transmission means of the lift truck of Figures 1 and 2, as shown in Figure 22, provides one forward gear ratio and one reverse gear ratio, although if desired this could be varied to provide a greater number of gear ratios.

The electric driven truck (Figures 3 and 4) comprises a pair of levers 262 and 263 extending through the enclosing panel 247 with the lever 262 providing for controlling the polarity of the electric motor to effect the desired direction of drive. The lever 263 controls appropriate contactor apparatus (not shown) for providing different speed ratios of the electric motor.

The above several control levers for the internal combustion engine driven truck and the electric motor driven truck are known, and it is believed need not be described in greater detail for purposes of my present invention. In connection with the arrangement of the pump 213 with the electric motor means to provide delivery of fluid under pressure in one continuous direction for actuating the tilt cylinder assembly means and the vertical cylinder means of the uprights, reference may be had to my copending application Serial No. 546,403, filed July 24, 1944, which has become Patent No. 2,414,192 on January 14, 1947, same being related to this subject matter generally.

Also, as shown in Figure 7, the two vehicles comprise a common form of fluid sump 265 for the fluid used in effecting hydraulic control of the load raising, lowering and tilting means, and a valve 266 therefor.

It will thus be observed from the above that I have provided an industrial truck which may be selectively driven by electric motor means or internal combustion engine means, and in which the auxiliary and ancillary parts of the truck may be assembled with respect to substantially similar main frame assemblies to provide for the standardization and duplication of substantially all of the parts other than the motive power means going into the construction of such trucks.

Reference may now be had to Figures 1, 2, 5, 8, and 10 through 13 for a description of the remaining parts making up the completed internal combustion engine powered truck of Figures 1 and 2. As shown in Figure 8, the side wall 52, 52 of the main frame assembly 51I is provided with a pair of upstanding angle iron posts 267 which are connected by transversely extending angle iron brackets 268 and 269 which provide for the support of a radiator 278 at the rearward end of the truck of Figures 1 and 2. A counterweight 271 having an end opening therein for admitting air therethrough to the radiator 278 is suitably connected to the rear end frame assembly 51I for counterbalancing a load on the load raising, lowering and tilting means forwardly of the truck. The posts 267 provide in part means for supporting the enclosing hood 246 and within which is disposed a gas tank 272 it being understood that the several other instrumentalities such as a carburetor, air cleaner, hose connections and the like are provided to complete the internal combustion engine means 22. Also one of the side walls 52 is provided with inwardly extending axle iron brackets 273 which provide for the support of storage battery means for the operation of the internal combustion engine along one side of the main frame assembly 51I.

The electric motor powered truck of Figures 3 and 4 has the main frame assembly 51E thereof provided with a pair of angle iron brackets 275 extending inwardly of each side of the spaced wall 53—53 thereof together with a connecting end angle iron frame member 277 at the rearward end of the frame assembly 51E which together with the transversely extending angle iron frame 218 provide for the support of a floor 279 to support storage battery means 280 rearwardly of the truck and above the steering wheels 50—50 thereof. The storage battery means 280 provides sufficient weight to counterbalance the load adapted to be raised and lowered on the upright means forwardly of the truck. Also the frame assembly 51E comprises a pair of angle corner posts 281 which form in part means for supporting the hood 248 enclosing the battery means of the truck. As shown in Figures 4 and 6, the hood comprises a pivoted cover member 283 and an end wall member 285 with a suitable clamp means 287 being provided for clamping the cover in closed position. As is more clearly illustrated in Figure 6, it will be seen that the electric motor means 23 lies between the vertically extending side walls 53—53 of the main frame assembly 51E with the battery means 280 being disposed rearwardly thereabove and over the steering wheels of the truck. The seat 117 for the electric power truck has pivotal connection at 290 and is arranged so that when the operator is not seated upon the truck a main control switch is opened to open the entire electric circuit of the electric motor drive means preventing accidental starting or actuation of the load raising, lowering and tilting means of the truck. This last referred to switch arrangement is more particularly described in my application above referred to.

It will be clear from Figure 5 that the counterweight 271 extends downwardly below the axis of the steering wheels 50—50 to enclose the same and form a bumper. In the main frame assembly 51E for the electric motor truck of Figures 3 and 4, it will be observed that a substantially U-shaped frame member 290 is secured transversely of the rearward end thereof providing a support between the side walls of the frame with the end wall portion thereof forming a continuation of the end panel 285.

While I have shown what I consider to be the preferred embodiments of my invention it will be understood that various modifications and rearrangements may be made therein without departing from the spirit and scope of my invention.

I claim:

1. In an industrial truck having driving and steering wheels the combination of a main frame comprising a pair of spaced vertical side walls, a rigid power unit comprising motive power means, transmission means, and a drive axle assembly for driving said driving wheels disposed within and extending lengthwise of said main frame between the side walls thereof with said drive axle assembly extending transversely of the forward end of said main frame, an axle supporting frame secured to and extending transversely of said main frame rearwardly thereof, an axle for said steering wheels mounted on said axle frame for pivotal movement about a horizontal axis extending lengthwise and centrally of said main frame, means at the forward end of said main frame for pivotally mounting the same on said drive axle assembly and resilient means between said main frame and said motive power means for mounting the end thereof opposite said drive axle assembly upon said main frame.

2. In an industrial truck having driving and steering wheels the combination of, a main frame comprising a pair of spaced vertical side walls, a rigid power unit comprising an internal combustion engine, transmission means, and a drive axle assembly disposed within and extending lengthwise of said main frame between the side walls thereof, said drive axle assembly being disposed forwardly of said frame and supporting said driving wheels, an axle supporting frame secured to and extending transversely of said main frame rearwardly thereof, an axle for said steering wheels mounted on said axle frame for pivotal movement about a horizontal axis extending lengthwise of and centrally of said main frame, means at the forward end of said main frame for pivotally mounting the same on said drive axle assembly, and means between the forward end of said internal combustion engine and said axle supporting frame for resiliently mounting the forward end of said internal combustion engine with respect to said main frame rearwardly thereof.

3. In an industrial truck or the like having driving and steering wheels the combination of, a main frame comprising a pair of spaced vertical side walls, a rigid power unit comprising electric motor means, a drive axle assembly, and transmission means between said motor means and said drive axle assembly disposed within and extending lengthwise of said main frame said drive axle assembly being disposed forwardly of said main frame and carrying said driving wheels, an axle supporting frame secured to and extending transversely of said main frame rearwardly thereof, an axle for said steering wheels mounted on said axle frame for pivotal movement about a horizontal axis extending lengthwise and centrally of said main frame, means at the forward end of said main frame for pivotally mounting the same on said drive axle assembly, and means between said electric motor means and said main frame providing a resilient mounting of the former on said main frame rearwardly thereof.

4. In an industrial truck having driving wheels at its forward end and steering wheels at its rearward end, the combination of a main frame comprising a pair of spaced vertical side walls, a power plant comprising a drive axle assembly, transmission means, and electric motor means rigidly secured together as a unit, said drive axle assembly having connection with said driving wheels and being disposed at the forward end of said main frame with said transmission means and said electric motor means extending lengthwise between said side walls rearwardly of said main frame, a differential carrier frame fixed to said side walls and extending transversely thereof forwardly of said main frame, said differential carrier frame and said drive axle assembly being formed for pivotally supporting the forward end of said main frame on said drive axle assembly, bracket means between said electric motor means and said main frame for supporting the rearward end of said electric motor means on said main frame below the upper edges of said side walls, and bracket means carried by said side walls for supporting battery means for said electric motor means rearwardly of and above said electric motor means and said steering wheels.

5. A frame assembly for an industrial truck having drive axle means carrying driving wheels, and an axle adapted to be pivotally mounted centrally of its ends for movement about a horizontal axis extending lengthwise of the frame for supporting steering wheels, comprising a main frame having a pair of spaced vertical side walls, a differential carrier frame secured to the side walls of said main frame and extending transversely and forwardly of said main frame, said differential carrier frame having bearing means at the forward end thereof for mounting the same upon said drive axle means, an axle supporting frame secured to the side walls of said main frame and extending transversely rearwardly thereof and providing for the pivotal mounting of said axle for said steering wheels, and said differential carrier frame having means adapted for the connection thereto of bracing means for said axle for said steering wheels.

ELMER J. DUNHAM.

REFERENCES CITED

The following references are of record in the file of this patent:

UNITED STATES PATENTS

| Number | Name | Date |
|---|---|---|
| 1,026,851 | Dearing | May 21, 1912 |
| 1,815,441 | Masury et al. | July 21, 1931 |
| 1,920,651 | Mackenzie | Aug. 1, 1933 |
| 2,180,917 | Terrell | Nov. 21, 1939 |
| 2,256,314 | Dunham | Sept. 16, 1941 |
| 2,270,664 | Weaver | Jan. 20, 1942 |
| 2,304,040 | Ulinski | Dec. 1, 1942 |
| 2,327,848 | Schroeder | Aug. 24, 1943 |
| 2,362,129 | Gfrorer | Nov. 7, 1944 |
| 2,368,121 | Dunham | Jan. 30, 1945 |
| 2,381,729 | Dunham et al. | Aug. 7, 1945 |

FOREIGN PATENTS

| Number | Country | Date |
|---|---|---|
| 439,673 | Germany | Jan. 15, 1927 |